US010825379B2

(12) United States Patent
Im et al.

(10) Patent No.: US 10,825,379 B2
(45) Date of Patent: Nov. 3, 2020

(54) LIGHT ADJUSTMENT DEVICE, METHOD OF PREPARING THE SAME, AND DISPLAY DEVICE

(71) Applicant: BOE TECHNOLOGY GROUP CO., LTD., Beijing (CN)

(72) Inventors: Yunsik Im, Beijing (CN); Zheng Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 27 days.

(21) Appl. No.: 16/388,677

(22) Filed: Apr. 18, 2019

(65) Prior Publication Data
US 2020/0020270 A1 Jan. 16, 2020

(30) Foreign Application Priority Data
Jul. 13, 2018 (CN) .......................... 2018 1 0769807

(51) Int. Cl.
*G09G 3/22* (2006.01)
*G02B 5/00* (2006.01)
*G02B 5/30* (2006.01)
*G02B 27/09* (2006.01)

(52) U.S. Cl.
CPC ............... *G09G 3/22* (2013.01); *G02B 5/003* (2013.01); *G02B 5/3025* (2013.01); *G02B 27/0977* (2013.01)

(58) Field of Classification Search
None
See application file for complete search history.

(56) References Cited

U.S. PATENT DOCUMENTS 8,767,145 B1 * 7/2014 Zhang ................. G02F 1/13471
349/96
2007/0268586 A1 * 11/2007 Mimura ................. G02B 5/003
359/599

* cited by examiner

*Primary Examiner* — Aneeta Yodichkas
(74) *Attorney, Agent, or Firm* — McDermott Will & Emery LLP

(57) ABSTRACT

A light adjustment device, a method of preparing the same, and a display device are provided, the light adjustment device includes: light-absorption portions spaced apart from one another, with first gaps each functioning as light ray passages and between each two adjacent light-absorption portions of the light-absorption portions, respectively; first electrodes being transparent and between each two adjacent light-absorption portions of the light-absorption portions respectively and at least partially located on both sides of each of the light ray passages; at least one second electrode being also transparent, each being in a respective one of the first gaps respectively, with second gaps each being between each second electrode and a respective adjacent one of the first electrodes; and transflective portions being electrically polarized and in the second gaps respectively, comprising light-transmitting portions and light-reflecting portions, the light-reflecting portions being steerable to be turned under an electric field force.

16 Claims, 5 Drawing Sheets transflective portions

Fig.7

```
providing a plurality of light-absorption
portions spaced apart from one another on a
side of a transparent substrate, with first
gaps each being formed between each two
adjacent light-absorption portions
            ↓
providing first electrodes each of which are
transparent and partially between each two
adjacent light-absorption portions
            ↓
providing at least one second electrode
which is also transparent in the first gaps
respectively, with second gaps each being
formed between each second electrode and a
respective adjacent first electrode
            ↓
providing transflective portions which are
electrically polarized between the at least one
second electrode and respective adjacent first
electrodes
```

```
forming at least one
transparent column
on a side of the light
ray reflecting layer
facing away from
the transparent
substrate, between
the plurality of light-
absorption portions
spaced apart from
one another
```

Fig.8(a)

providing a plurality of light-absorption portions spaced apart from one another on a side of a transparent substrate > forming a light ray reflecting layer on a side of the transparent substrate
>
> ↓
>
> forming a plurality of light-absorption portions spaced apart from one another on a side of the light ray reflecting layer facing away from the transparent substrate

Fig. 8(b)

providing transflective portions which are electrically polarized

> forming a plurality of transparent spheres by a crystallization process
>
> ↓
>
> placing each of the plurality of transparent spheres inside a respective hemispherical groove, and then forming a metal reflective layer covering an exposed portion of an outer surface of each of the plurality of transparent spheres by evaporation
>
> ↓
>
> preparing a plurality of transflective spheres which are electrically polarized, by supplying the metal reflective layer evaporated on the exposed portions of the outer surface of each of the plurality of transparent spheres with charge having a single electric polarity
>
> ↓
>
> forming the transflective portions by mixing the plurality of transflective spheres within a solution

Fig. 8(c)

LIGHT ADJUSTMENT DEVICE, METHOD OF PREPARING THE SAME, AND DISPLAY DEVICE

CROSS-REFERENCE TO RELATED APPLICATION

The present disclosure claims the benefit of Chinese Patent Application Invention No. 201810769807.X filed on Jul. 13, 2018 in the State Intellectual Property Office of China, the whole disclosure of which is incorporated herein by reference.

BACKGROUND

Field

Embodiments of the present disclosure generally relate to but are not limited to the technical field of display technology, and in particular, to a light adjustment device, a method of preparing the same, and a display device.

Description of the Related Art

A display screen in a relevant art has a property that it is optically observable in a certain angular range defined by a sight light of an observer with respect to a display surface of the display screen so as to implement its display functionality, facilitating observation of images around the display surface of the display screen, and having an advantage of providing a wide-angle viewing for the observer.

On some special occasions, for example for protecting personal privacy, it is required to satisfy a requirement on functionality of light exiting at a relatively small light emergent angle. As to a peep-proof display screen, it has a plurality of light-absorbing plates arranged parallel to one another therein and for example perpendicular to a light-emergent surface of the display screen, and the peep-proof display screen has also its light-emitting source configured to emit light towards slits among the plurality of light-absorbing plates such that light rays at relatively larger angles may be absorbed while light rays at relatively smaller angles may pass through the slits to implement imaging, thereby implement a peep-proof functionality against peeping by other peepers therearound. And the peep-proof display is also provided with polymer liquid crystals at a light-emergent side of the plurality of light-absorbing plates. In a condition that it is required to implement a wide-angle display status, by turning-on a diffusion condition of the polymer liquid crystals, facilitating an adjustment of diffusion of light rays at relatively smaller angles by the polymer liquid crystals, such that the peep-proof display screen exhibits a wide-angle display status.

SUMMARY

The embodiments of the present disclosure have been made to overcome or alleviate at least one aspect of the above mentioned disadvantages and/or shortcomings in the prior art, by providing a light adjustment device, a method of preparing the same, and a display device.

Following technical solutions are adopted in exemplary embodiments of the invention.

According to one aspect of embodiments of the disclosure, there is provided a light adjustment device, comprising:

a plurality of light-absorption portions spaced apart from one another, with first gaps each functioning as light ray passages and being formed between each two adjacent light-absorption portions of the plurality of light-absorption portions, respectively;

first electrodes being transparent and provided between each two adjacent light-absorption portions of the plurality of light-absorption portions respectively and at least partially located on both sides of each of the light ray passages;

at least one second electrode being also transparent, each second electrode being provided in a respective one of the first gaps respectively, with second gaps each being formed between each second electrode and a respective adjacent one of the first electrodes; and transflective portions being electrically polarized and provided in the second gaps respectively, comprising light-transmitting portions and light-reflecting portions, the light-reflecting portions being steerable to be turned under an action of an electric field force.

According to an exemplary embodiment of the present disclosure, in response to a first steering condition of the transflective portions where at least one type of the first electrodes and the at least one second electrode are not energized and thus no electric field force is established therebetween to act on the transflective portions, the light-transmitting portions communicate optically with the plurality of light-absorption portions and the light ray passages on both sides of the transflective portions, respectively; and in response to a second steering condition of the transflective portions, where the transflective portions are steered to be turned thereto under the action of an electric field force applied by an electric field which is established between the first electrodes and at least one second electrode once both the first electrodes and the at least one second electrode are energized respectively and is then provided for the light-reflecting portions of the transflective portions, the light-reflecting portions between the first electrodes and respective portions of the at least one second electrode on both sides of the light ray passages are respectively turned to opposite to each other.

According to an exemplary embodiment of the present disclosure, the light adjustment device further comprises:

a light ray reflecting layer, on a side of the plurality of light-absorption portions facing towards a light incidence direction of the light ray passages.

According to an exemplary embodiment of the present disclosure, the transflective portions comprises a solution accommodated within the second gaps and arranged in an extension direction of an optical path through the light ray passages and a plurality of transflective spheres mixed within the solution, each of the plurality of transflective spheres comprising a transparent sphere and a metal reflective layer covering a portion of an outer surface of the transparent sphere at a side thereof, the metal reflective layer being a metallic layer with charge of a single electric polarity and having a reflective surface.

According to an exemplary embodiment of the present disclosure, in a condition that the first electrodes and the at least one second electrode cooperate with each other to provide the electric field force for the light-reflecting portions of the transflective portions, the first electrodes have an electric polarity opposite to that of the at least one second electrode.

According to an exemplary embodiment of the present disclosure, the plurality of light-absorption portions spaced apart from one another comprise a first light absorber and a second light absorber opposite to each other;

the first electrodes comprise a first electrode layer provided on a side of the first light absorber facing towards the second light absorber, and a second electrode layer provided on a side of the second light absorber facing towards the first light absorber;

the transflective portions comprises a first transflective layer and a second transflective layer being provided respectively between the first electrodes and respective portions of the at least one second electrode on both sides of the light ray passages, with a transparent column between the first transflective layer and the second transflective layer; and the at least one second electrode comprises a third electrode layer and a fourth electrode layer respectively provided at both sides of the transparent column, the third electrode layer being arranged opposite to the first electrode layer, and the fourth electrode layer being arranged opposite to the second electrode layer.

According to another aspect of the exemplary embodiment of the present disclosure, there is provided a display device, comprising:

a light source device; and a light adjustment device on a light-emergent side of the light source device, the light adjustment device comprising:

a plurality of light-absorption portions spaced apart from one another, with first gaps each functioning as light ray passages and being formed between each two adjacent light-absorption portions of the plurality of light-absorption portions, respectively;

first electrodes being transparent and provided between each two adjacent light-absorption portions of the plurality of light-absorption portions respectively and at least partially located on both sides of each of the light ray passages;

at least one second electrode being also transparent, each second electrode being provided in a respective one of the first gaps respectively, with second gaps each being formed between each second electrode and a respective adjacent one of the first electrodes; and transflective portions being electrically polarized and provided in the second gaps respectively, comprising light-transmitting portions and light-reflecting portions, the light-reflecting portions being steerable to be turned under an action of an electric field force, wherein the light source device is configured to emit light towards a light-incidence side of the light ray passages.

According to an exemplary embodiment of the present disclosure, the display device further comprising: a display panel, the light source device functioning as a backlight source configured to provide backlight to the display panel, wherein the light adjustment device is located between the display panel and the backlight source.

According to still another aspect of the exemplary embodiment of the present disclosure, there is provided a method of preparing a light adjustment device, comprising:

providing a plurality of light-absorption portions spaced apart from one another on a side of a transparent substrate, with first gaps each being formed between each two adjacent light-absorption portions of the plurality of light-absorption portions and functioning as light ray passages, respectively;

providing first electrodes which are transparent between each two adjacent light-absorption portions of the plurality of light-absorption portions respectively, the first electrodes being at least partially located on both sides of each of the light ray passages;

providing at least one second electrode which is also transparent in the first gaps respectively, with second gaps each being formed between each second electrode and a respective adjacent one of the first electrodes; and providing transflective portions which are electrically polarized between the at least one second electrode and respective adjacent first electrodes respectively, the transflective portions comprising light-transmitting portions and light-reflecting portions, the light-reflecting portions being steerable to be turned under an action of an electric field force.

According to an exemplary embodiment of the present disclosure, the method further comprising: preparing the transflective portions, the step of "providing transflective portions" comprising:

forming a plurality of transparent spheres by a crystallization process;

placing each of the plurality of transparent spheres inside a respective hemispherical groove, and then forming a metal reflective layer covering an exposed portion of an outer surface of each of the plurality of transparent spheres by evaporation;

preparing a plurality of transflective spheres which are electrically polarized, by supplying the metal reflective layer evaporated on the exposed portions of the outer surface of each of the plurality of transparent spheres with charge having a single electric polarity; and forming the transflective portions by mixing the plurality of transflective spheres within a solution.

According to an exemplary embodiment of the present disclosure, the step of "providing a plurality of light-absorption portions spaced apart from one another on a side of a transparent substrate" comprises:

forming a light ray reflecting layer on a side of the transparent substrate; and forming a plurality of light-absorption portions spaced apart from one another on a side of the light ray reflecting layer facing away from the transparent substrate.

According to an exemplary embodiment of the present disclosure, the light ray reflecting layer is provided on a side of the transparent substrate facing towards the light adjustment device formed on the light ray reflecting layer, by abutting against a surface at a side of light adjustment device facing towards the transparent substrate.

According to an exemplary embodiment of the present disclosure, prior to the step of "providing at least one second electrode which is also transparent in the first gaps respectively" and after the step of "providing first electrodes which are transparent between each two adjacent light-absorption portions of the plurality of light-absorption portions respectively", the method further comprises:

forming at least one transparent column on a side of the light ray reflecting layer facing away from the transparent substrate, at least one transparent column being provided between the plurality of light-absorption portions spaced apart from one another, respectively.

According to an exemplary embodiment of the present disclosure, prior to the step of "providing first electrodes which are transparent between each two adjacent light-absorption portions of the plurality of light-absorption portions respectively" and after the step of "providing a plurality of light-absorption portions spaced apart from one another on a side of a transparent substrate", the method further comprises:

forming at least one transparent column on a side of the light ray reflecting layer facing away from the transparent substrate, at least one transparent column being provided between the plurality of light-absorption portions spaced apart from one another, respectively.

According to an exemplary embodiment of the present disclosure, the step of "providing at least one second electrode which is also transparent in the first gaps respectively" comprises:

forming a respective second electrode of the at least one second electrode on outer surfaces of each transparent column at both sides thereof, one portion of the respective second electrode at one side of the transparent column being opposite to a respective one first electrode on a side of the transparent column, while another portion of the respective second electrode at the other side of transparent column being opposite to another respective one first electrode on the other side of the transparent column.

Above descriptions are merely a summary of technical solutions of embodiments of the disclosure for obtaining a more clear and comprehensive understanding of technical means adopted in embodiments of the disclosure, and thus may be implemented according to contents of the description. Following exemplary embodiments are set forth in detail with reference to drawings attached hereinafter.

BRIEF DESCRIPTION OF THE DRAWINGS

Various and other advantages and benefits of the embodiments of the disclosure may become apparent to those skilled in the art by reviewing detailed depictions of exemplary implementations hereinafter. Accompanying drawings are merely illustrated for showing exemplary implementations, rather than being construed as a limitation to the technical schemes of the present disclosure. And throughout the drawings, similar reference signs are used to represent similar components. In the drawings:

FIG. 7 illustrates a schematic view of an arrangement of a plurality of transflective portions in the wide-angle display functionality of the light adjustment device according to embodiments of the disclosure;

FIG. 8(a) illustrates a flow chart of the method of preparing the light adjustment device according to embodiments of the disclosure;

FIG. 8(b) illustrates a details flow chart of a step of "providing a plurality of light-absorption portions spaced apart from one another on a side of a transparent substrate" in the method of preparing the light adjustment device according to embodiments of the disclosure;

FIG. 8(c) illustrates a details flow chart of a step of "providing at least one second electrode which is also transparent in the first gaps respectively" in the method of preparing the light adjustment device according to embodiments of the disclosure.

DETAILED DESCRIPTION OF EMBODIMENTS

Figure 1:
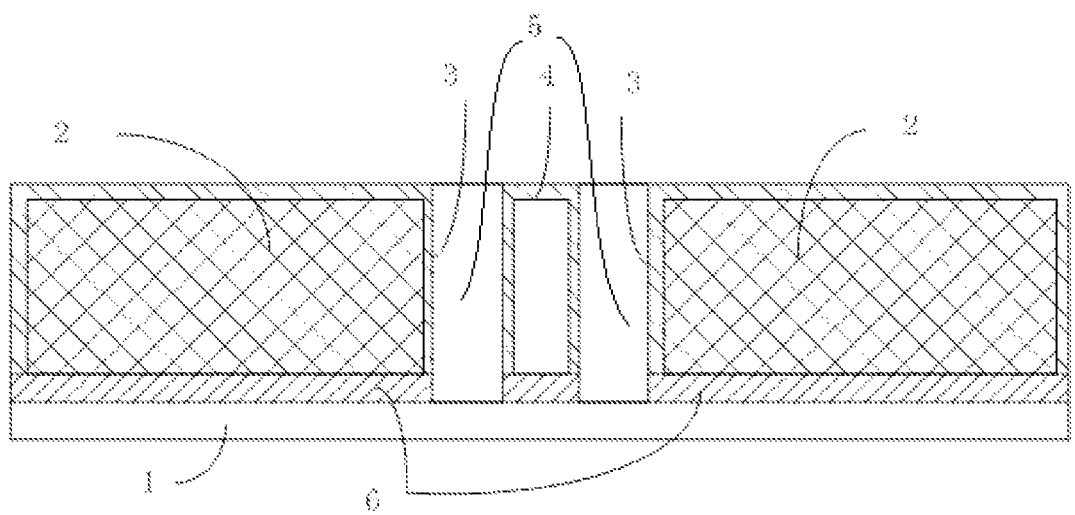
FIG. 1 illustrates a structural schematic view of a light adjustment device prepared by a method of preparing the light adjustment device according to embodiments of the disclosure.

In order to further set forth technical means and corresponding efficacy/utility adopted by embodiments of the disclosure for achieving expected purposes of embodiments of the disclosure, then, specific implementations, structures, features and efficacy/utility of a light adjustment device and a method of preparing the same, and a display device as provided in embodiments of the disclosure are depicted in detail hereinafter, by exemplary embodiments in view of accompanying drawings. In the following description, different expressions of "an/one embodiment" or "embodiments" may not necessarily refer to one and the same embodiment. In addition, specific features, structures, or characteristics in one or more embodiments may be combined in any appropriate form.

Due to influence that light rays are absorbed by light-absorbing plates, a peep-proof display screen in a relevant art has a relatively low luminance in a wide-angle display status. In view of this, a light adjustment device, a method of preparing the same, and a display device are provided in embodiments of the disclosure.

Respective dimension and shape of each component in the drawings are only intended to exemplarily illustrate the contents of the disclosure, rather than to demonstrate the practical dimension or proportion of components of a light adjustment device and a display device according to an embodiment of the disclosure.

Figure 2:
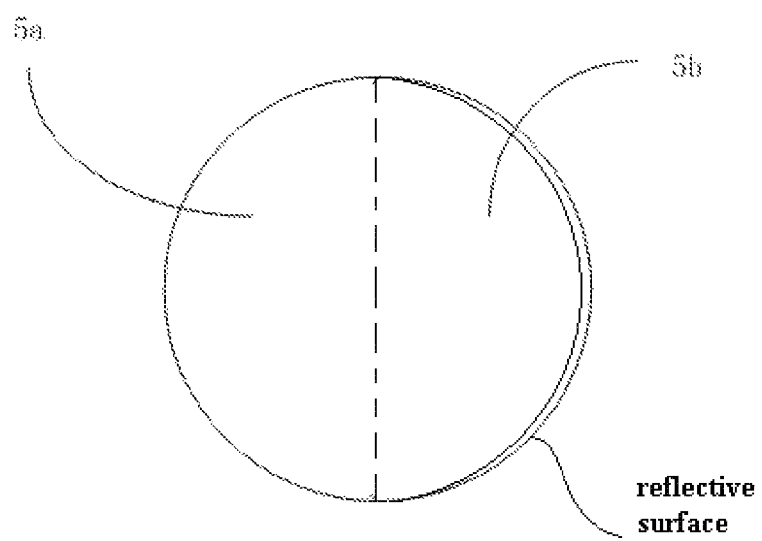
FIG. 2 illustrates a structural schematic view of transflective portions prepared by the method of preparing the light adjustment device according to embodiments of the disclosure.
Figure 3:
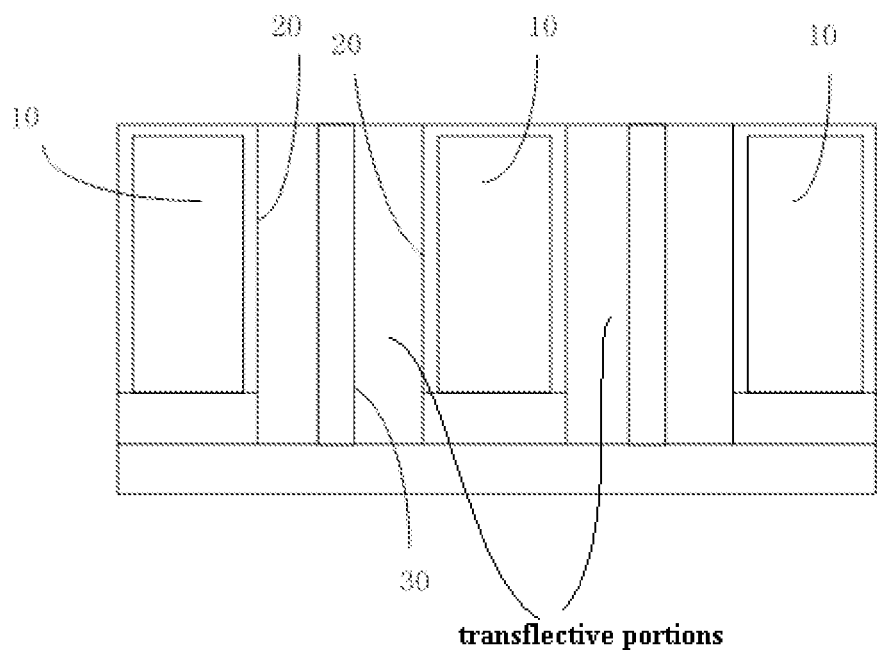
FIG. 3 illustrates a structural schematic view of a light adjustment device according to embodiments of the disclosure.

FIGS. 1 and 2 illustrate exemplary embodiments of a light adjustment device prepared by a method of preparing the light adjustment device according to embodiments of the disclosure; and FIG. 3 illustrates a structural schematic view of a light adjustment device according to embodiments of the disclosure. According to a general technical concept of the embodiments of the disclosure, in an aspect of embodiments of the disclosure, as illustrated in FIG. 3, by way of example, a light adjustment device is provided according to an embodiment of the disclosure, comprising: a plurality of light-absorption portions 10 spaced apart from one another, with first gaps each functioning as light ray passages and being formed between each two adjacent light-absorption portions 10 of the plurality of light-absorption portions, respectively; first electrodes 20 being transparent and provided between each two adjacent light-absorption portions 10 of the plurality of light-absorption portions 10 respectively and for example at least partially located on both sides of each of the first gaps; at least one second electrode 30 being also transparent, each second electrode being provided in a respective one of the first gaps respectively, with second gaps each being formed to space apart each second electrode and a respective adjacent one of the first electrodes; and transflective portions being electrically polarized (i.e., electro-polar transflective portions; in other words, each transflective portion has electrically polarity and is electrically rotatable) and provided in the second gaps respectively.

By way of example, specifically as illustrated in FIG. 3, each of the first gaps is provided between two adjacent light-absorption portions 10 spaced apart from one another and functions as a respective one light ray passage. The first electrodes 20 are provided between each two light-absorption portions 10 spaced apart from each other and at least partially located at both sides of the light ray passages. The second electrode 30 is for example provided between the two adjacent first electrodes on both sides of the light ray passages. And the transflective portions are provided between portions of the first electrodes 20 and the second electrode 30 on both sides of the light ray passages, and the transflective portions comprise light-transmitting portions and light-reflecting portions, the light-reflecting portions being steerable to be turned under an action of an electric field force.

Then an operation principle of the light adjustment device prepared by the method of preparing the light adjustment device as above is discussed in detail in exemplary embodiments of the disclosure. The light adjustment device is configured to adjust a light-emergent angle of light rays passing therethrough by an electric field force applied thereon specifically as follows.

On one hand, in a condition that the transflective portions are in a first steering condition where the transflective portions are not acted upon by an electric field force applied by any electric field (for example, at least one type of the first electrodes 3 the at least one second electrode 30 are not energized and thus no electric field force is established therebetween such that the transflective portions are not controlled by any electric field force), then respective light-transmitting portions of adjacent transflective portions spaced apart by the at least one second electrode which is transparent communicate optically with each other or one another through the at least one second electrode, and respective optical paths of the transflective portions in turn optically communicate with the plurality of light-absorption portions 10 and the first gaps (especially the second gaps therein) functioning as the light ray passages on both sides of the transflective portions. On the other hand, in a condition that the transflective portions are steered to be turned to a second steering condition under the action of an electric field force applied by an electric field which is established between the first electrodes and at least one second electrode once both the first electrodes and the at least one second electrode are energized respectively, then the light-reflecting portions of one of the transflective portions disposed between the at least one second electrode 30 and respective portions of the first electrodes 20 located at a side of the first gaps may be opposite to the light-reflecting portions of another one of the transflective portions disposed between the at least one second electrode 30 and respective portions of the first electrodes 20 located at an opposite side of the first gaps. In the second steering condition, as for the light adjustment device, electric polarity of the first electrodes and electric polarity of the at least one second electrode are opposite to each other; specifically, a direction of the electric field established between the first electrodes and the at least one second electrode and electric polarity of the light-reflecting portions of the transflective portions may be determined depending on an expected direction the transflective portions are to be turned to under the action of a force applied by the electric field.

Figure 4:
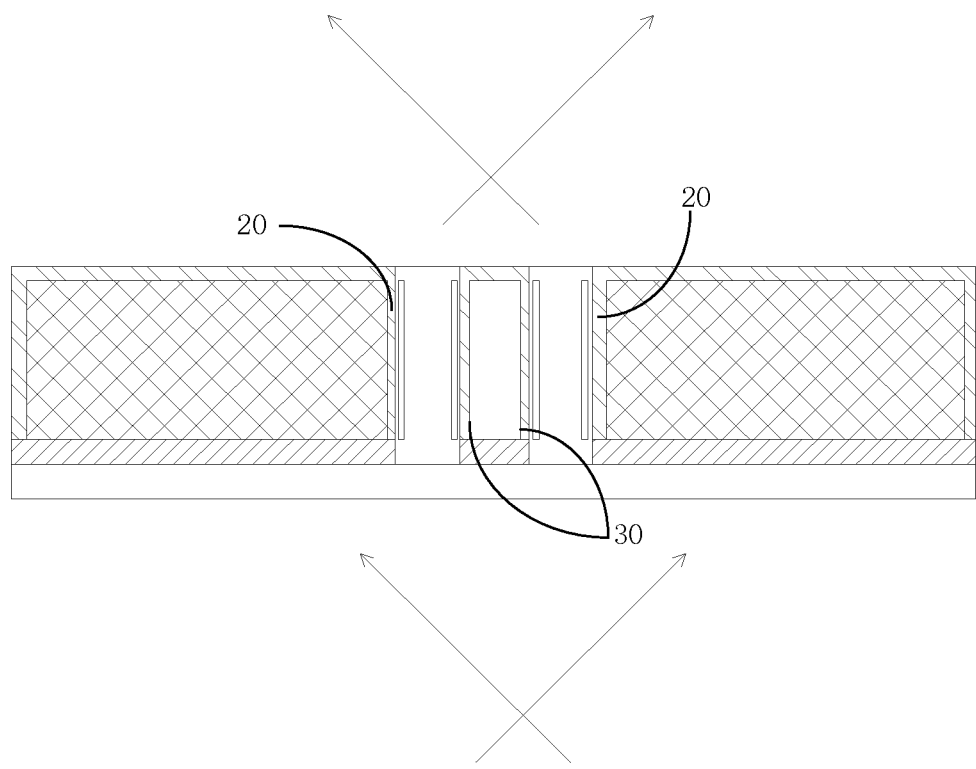
FIG. 4 illustrates a schematic view of a wide-angle display functionality of the light adjustment device according to embodiments of the disclosure.
Figure 5:
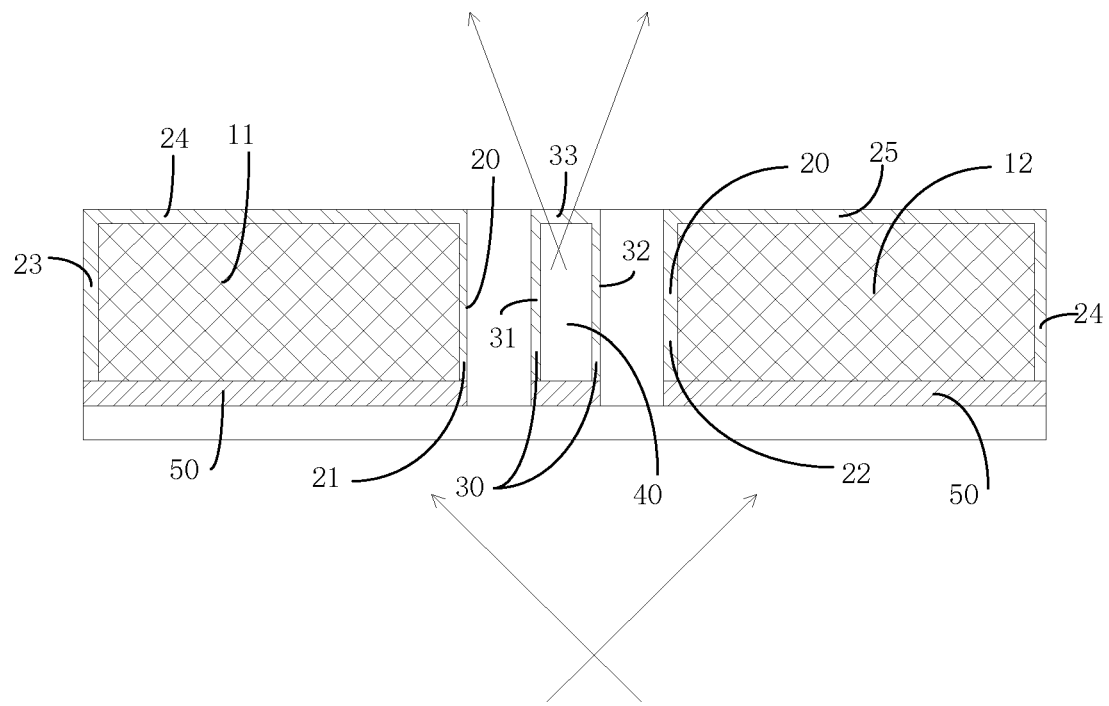
FIG. 5 illustrates a schematic view of a peep-proof display functionality of the light adjustment device according to embodiments of the disclosure.

FIG. 4 illustrates a schematic view of a wide-angle display functionality of the light adjustment device according to embodiments of the disclosure; and FIG. 5 illustrates a schematic view of a peep-proof display functionality of the light adjustment device according to embodiments of the disclosure.

With reference to FIG. 4 and FIG. 5, operations of the light adjustment device respectively in the first steering condition (i.e., a condition in which no electric field force is applied on the light adjustment device) and the second steering condition (i.e., an electric field force is applied on the light adjustment device indeed) as above are set forth in detail in exemplary embodiments hereinafter. In a technical solution provided in embodiments of the disclosure, the light adjustment device is for example provided at a light-emergent side of a light source device of a display device, and the light source device is configured to emit light towards a light-incidence side of the light ray passages of the light adjustment device.

As illustrated in FIG. 4, in a condition that the wide-angle display functionality is required to be implement (abbreviated as a "wide-angle display mode" hereinafter), an electric field is established between the first electrodes 20 and the at least one second electrode 30. When the light-reflecting portions of the transflective portions respectively disposed between the first electrodes 20 and the at least one electrode 30 on both sides of the light ray passages are rotates to be opposite to each other, by steering the rotation of the transflective portions, i.e., when the light adjustment device is in the first steering condition, then, light rays incident at a wide-angle with reference to a normal direction at the light emergent side of the light source device may be reflected by the opposite light-reflecting portions and then pass through the light ray passages to implement the wide-display functionality.

As illustrated in FIG. 5, in a condition that the peep-proof display functionality is required to be implement (abbreviated as a "peep-proof display mode" hereinafter), it is not required to establish any electric field between the first electrodes 20 and the at least one second electrode 30. Then the transflective portions are out of control without any electric field, i.e., in a disordered status, and thus the optical paths of the light-transmitting portions of the transflective portions in the disordered status facilitate an optical communication between the light-absorption portions and the light ray passages on both sides of the transflective portions, i.e., when the light adjustment device is in the second steering condition. Hereby a continuous and successive light propagation path is established, among one light-absorption portion 10 and one transparent first electrode 20 and light-transmitting portions of one transflective portion at a side of the first gap, and the second electrode 30, and another light-absorption portion 10 and another transparent first electrode 20 and light-transmitting portions of another transflective portion at an opposite side of the first gap, such that for example light rays incident from a lower side of the drawing as illustrated (e.g, from the light source device located at the lower side) may transmit through the continuous and successive light propagation path, and then relatively wide angle portions of the incident light rays may be transmitted into the light-absorption portions and absorbed there, with merely relatively narrow angle portions of the incident light rays passing through the first gap functioning as the light ray passage (especially through the light-transmitting portions of the transflective portion in each second gap inside the first gap) and then exiting from the light adjustment device to the observer's eye(s) so as to implement display functionality. Thereby, the relatively wide angle portions of the incident light rays enter the light ray passages, and then are incident on and absorbed by the light-absorption portions through the light-transmitting portions; while other portions of the incident light rays (for example referred to as the "relatively narrow angle portions" with reference to the relatively wide angle portions) may for example propagate through the light ray passage and then be received as emergent light rays by human eyes so as to implement the display functionality.

As such, as compared with relevant art, in the peep-proof display mode, there may exist a relatively weak display luminance due to light loss caused by transmission to the light-absorption portions; while in another wide-angle display mode, in a process of the incident light rays pass through the light adjustment device, there may exist no such light loss of the relatively wide angle portions of incident light rays transmitting to and being absorbed by the light-absorption portions through the light-transmitting portions of the transflective portions. Therefore, a relatively strong luminance of emergent light rays may be observed by eyes in the wide-angle display mode.

The transflective portions may have a single electric polarity, for example, positive electric polarity (i.e., the light-reflecting portions carry positive charges), or negative electric polarity (i.e., the light-reflecting portions carry negative charges). In the wide-angle display mode, the electric polarity of the first electrodes is opposite to the electric polarity of the at least one second electrode, both electric polarities are determined depending on specific types of the charges carried by the light-reflecting portions of the transflective portions.

Figure 6:
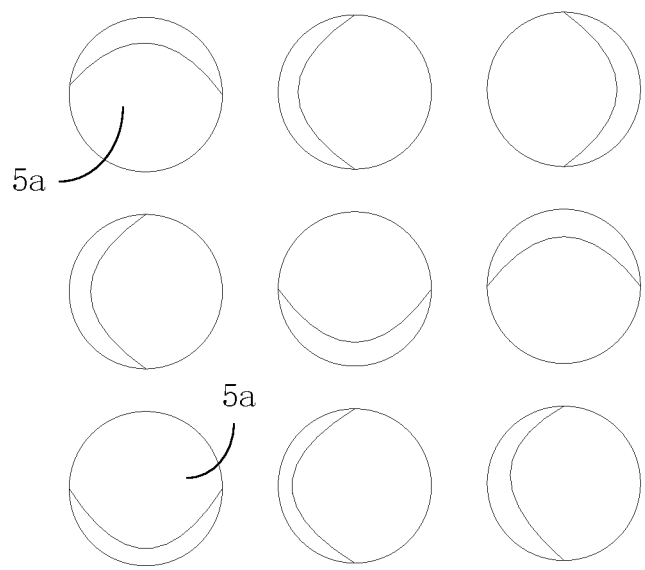
FIG. 6 illustrates a schematic view of an arrangement of a plurality of transflective portions in the peep-proof display functionality of the light adjustment device according to embodiments of the disclosure.

In the peep-proof display mode, the first electrodes and/or the at least one second electrode may carry electric charges, thus no electric field may be established between the first electrodes and the at least one second electrode; accordingly, the transflective portion disposed in the second gaps between the first electrodes and the at least one second electrode may be out of control by any electric field and thus be in a disordered status. By way of example, in such a condition, the transflective portions may be defined to be in the first steering condition, and the light-transmitting portions of the transflective portions optically communicate with the light-absorption portions and the light ray passages on both sides of the transflective portions. And in the wide-angle display mode, it is required that the transflective portions is steered under the control of an electric field to turn to a light-reflective status; for example, when the first electrodes, and the at least one second electrode are energized respectively to provide an electric field for the light-reflecting portions of the transflective portions, then in such a condition the transflective portions may be defined to be steered to turn to the second steering condition under the action of the electric field force applied by the electric field, such that the light-reflecting portions of the transflective portions disposed respectively between the first electrodes and the portions of the at least one second electrode on both sides of the light ray passages may be opposite to each other. The transflective portion may for example comprise a solution arranged in an extension direction of an optical path through the light ray passages (i.e., the solution filling up the second gaps inside the first gap in a longitudinal direction of the first gaps, i.e., in a vertical direction, as illustrated) and a plurality of transflective spheres mixed within the solution, each of the plurality of transflective spheres comprising a transparent sphere and a metal reflective layer covering a portion of an outer surface of the transparent sphere at a side thereof, the metal reflective layer being a metallic layer with charge of a single electric polarity and having a reflective surface. As illustrated in FIG. 6, the transflective portions are in the first steering condition, and in the plurality of transflective spheres, optical paths of light-transmitting portions of at least a portion of the plurality of transflective spheres may optically communicate with the light-absorption portions and the light ray passages on both sides of the transflective portions. As illustrated in FIG. 7, the transflective portions are steered to turn to the second steering condition, and respective light-reflecting portions 5*b* of the plurality of transflective spheres between the first electrodes and the at least one second electrode on both sides of the light ray passages are opposite to each other, so as to form collectively a light-reflective layer in a direction of the light ray passages, on both sides of the light ray passages.

In some embodiments, as illustrated in FIGS. 4 and 5, the light adjustment device further comprises a transparent column 40. Specifically, as illustrated in FIGS. 4 and 5, the plurality of light-absorption portions 10 spaced apart from one another comprise a first light absorber 11 and a second light absorber 12 opposite to each other; the first electrodes comprise a first electrode layer 21 provided on a side of the first light absorber 11 facing towards the second light absorber, and a second electrode layer 22 provided on a side of the second light absorber 12 facing towards the first light absorber; the transflective portions comprises a first transflective layer and a second transflective layer being provided respectively between the first electrodes 20 and respective portions of the at least one second electrode 30 on both sides of the light ray passages, with a transparent column 40 between the first transflective layer and the second transflective layer; and the at least one second electrode 30 comprise a third electrode layer 31 and a fourth electrode layer 32 respectively provided at both sides of the transparent column, the third electrode layer 31 being arranged opposite to the first electrode layer 21, and the fourth electrode layer 32 being arranged opposite to the second electrode layer 22. The transparent column is for example formed by a resin material, but not limited thereto.

Further, the at least one second electrode 30 comprises a fifth electrode layer 33 provided on a top of the transparent column 40, the fifth electrode layer 33 electrically connects with the third electrode layer 31 and the fourth electrode layer 32; in specific implementation, for example, by using an electrode contact to function as the fifth electrode layer 33, then the third electrode layer and the fourth electrode layer may be energized.

The first electrode layer 21 is provided on a side of the first light absorber 11, and a respective first electrode 20 comprises a sixth electrode layer 23 provided on the other side of the first light absorber 11, and a seventh electrode layer 24 provided on a top of the first absorber 11, the seventh electrode layer 24 electrically connecting with the first electrode layer 21 and the sixth electrode layer 23; in specific implementation, for example, by using an electrode contact to function as the seventh electrode layer 24, then the first electrode layer and the sixth electrode layer may be energized. The sixth electrode layer is configured to provide an electric field to a transflective portion on the other side of the first light absorber.

The second electrode layer 22 is provided on a side of the second light absorber 12, and a respective first electrode 20 comprises a eighth electrode layer 24 provided on the other side of the second light absorber 12, and a ninth electrode layer 25 provided on a top of the second absorber 12, the ninth electrode layer 25 electrically connecting with the second electrode layer 22 and the eighth electrode layer 24; in specific implementation, for example, by using an electrode contact to function as the ninth electrode layer 25, then the second electrode layer and the eighth electrode layer may be energized. The eighth electrode layer is configured to provide an electric field to a transflective portion on the other side of the second light absorber.

In some other embodiments, the light adjustment device further comprises: a light ray reflecting layer 50 disposed on a side of the plurality of light-absorption portions facing towards a light incidence direction of the light ray passages. The light adjustment device is applied in the display device, facilitating a reflection of light rays irradiating in the light incidence direction of the light ray passages, effectively preventing the light rays from being absorbed by the light-absorption portions. The light rays reflected by the light ray reflecting layer may for example be reflected once again by a reflective surface of a backlight source and re-enter the light ray passages.

As compared with relevant art, aforementioned light adjustment device according to embodiments of the disclosure, uses the transflective portions which may be steered to turn under the action of the electric field force applied thereon, and the electric field may merely be applied in the peep-proof display mode, so as to avoid any light loss caused by light absorption of incident light rays being transmitted to the light-absorption portions in the wide-angle display mode where no electric field is applied, such that the light luminance of incident light rays for implementing display in such a mode may be relatively strong.

According to another aspect of embodiments of the disclosure, a display device is further provided, comprising a light source device and the light adjustment device as above.

As mentioned above, the light adjustment device comprises: a plurality of light-absorption portions spaced apart from one another, with first gaps each functioning as light ray passages and being formed between each two adjacent light-absorption portions of the plurality of light-absorption portions, respectively; first electrodes being transparent and provided between each two adjacent light-absorption portions of the plurality of light-absorption portions respectively and at least partially located on both sides of each of the light ray passages; at least one second electrode being also transparent, each second electrode being provided in a respective one of the first gaps respectively, with second gaps each being formed between each second electrode and a respective adjacent one of the first electrodes; and transflective portions being electrically polarized and provided in the second gaps respectively. Specifically, between each two adjacent light-absorption portions spaced apart in the plurality of light-absorption portions spaced apart from one another, respective one of the first gaps functioning as the light ray passages may be provided; the first electrodes are provided respectively in each two adjacent light-absorption portions spaced apart, and for example respectively located on both sides of each of the light ray passages; each second electrode is provided in a respective one of the first gaps on both sides of each of the light ray passages; the transflective portions are located respectively between the at least one second electrode and the portions of the first electrodes on both sides of light ray passages, and the transflective portions comprise light-transmitting portions and light-reflecting portions, the light-reflecting portions being steerable to be turned under an action of an electric field force.

The light adjustment device is located on a light-emergent side of the light source device of the display device, and the light source device of the display device is configured to emit light towards a light-incidence side of the light ray passages.

The display device may for example be any product or component having display functionality, such as, a display panel, an electronic paper device, a mobilephone or a cellphone, a tablet computer, a television set, monitor, a laptop computer, a digital photo-frame, a navigator or the like.

As for the display device, in the wide-angle display mode, since an electric field is established between the first electrodes and the at least one second electrode, the transflective portions may in turn be steered to turn/rotate, such that the light-reflecting portions of the transflective portions disposed respectively between the at least one second electrode and the first electrodes on both sides of the light ray passages are opposite to each other, then light rays incident at a relatively wide angle with respect to a normal direction at the light emergent side of the light source device may be reflected by the opposite light-reflecting portion on both sides and then propagate through the light ray passages and then be received by observer's eye so as to implement the wide-angle display functionality, such that the light luminance in the wide-angle display mode may be relatively strong, as compared with relevant art.

The display device further comprises a display panel, the light adjustment device may for example formed integrally with the display panel; or alternatively, the light adjustment device and the display panel may be formed as individual structures separately provided. By way of example, the light source device of the display device functions as a backlight source configured to provide backlight to the display panel, and the light adjustment device is located between the display panel and the backlight source.

The display device according to embodiments of the disclosure also has technical effects and advantages of aforementioned light adjustment device, without repeating herein any more.

Referring back to FIGS. 1 and 2, in yet another aspect of embodiments of the disclosure, as illustrated in the flow chart of FIG. 8(a) showing a flow chart of the method of preparing the light adjustment device according to embodiments of the disclosure, a method of preparing the light adjustment device is provided, comprising:

providing a plurality of light-absorption portions 2 spaced apart from one another on a side of a transparent substrate, with first gaps each being formed between each two adjacent light-absorption portions of the plurality of light-absorption portions 2 and functioning as light ray passages, respectively;

providing first electrodes 3 which are transparent between each two adjacent light-absorption portions of the plurality of light-absorption portions 2 respectively, the first electrodes 3 being at least partially located on both sides of each of the first gaps (for example, as illustrated in FIG. 1, the first electrodes 3 are provided respectively to abut tightly against sidewalls of respective ones of two adjacent light-absorption portions 2 facing towards the first gap therebetween);

providing at least one second electrode 4 which is also transparent in the first gaps respectively, with second gaps each being formed between each second electrode 4 and a respective adjacent one of the first electrodes 3; and providing transflective portions 5 which are electrically polarized (i.e., transflective portion which has electrically polarity and is electrically rotatable), each transflective portion being between each second electrode 4 and a respective one adjacent first electrode 3 respectively, such that adjacent transflective portions 5 in each first gap are spaced apart from each other by the transparent second electrode; each of the transflective portions comprising a plurality of transflective spheres each in the form of sphere body, and as illustrated in FIG. 2, each transflective sphere comprising a light-transmitting portion 5a and a light-reflecting portion 5b (a dotted line as illustrated exemplarily represents a boundary line between the light-transmitting portion 5a and the light-reflecting 5b, and a portion of a spherical shell of the illustrated transflective sphere indicated by a reference sign "reflective surface" herein refers to a reflective surface having certain thickness and covering on the light-reflecting portion 5b), and the transflective portions 5 (more specifically, its light-reflecting portions) carrying positive or negative charges so as to have electric polarity, and thus being steerable to be turned under an action of an electric field force applied by an external electric field.

Referring back to FIGS. 4 and 5, operations of the light adjustment device respectively in the first steering condition and the second steering condition as above are set forth in detail in exemplary embodiments hereinafter. The light adjustment device is for example provided at a light-emergent side of a light source device of a display device, and the light source device is configured to emit light towards a light-incidence side of the light ray passages of the light adjustment device. As illustrated in FIG. 4, in a condition that the wide-angle display functionality is required to be implement (abbreviated as a "wide-angle display mode" hereinafter), an electric field is established between the first electrodes and the at least one second electrode. When the light-reflecting portions of the transflective portions respectively disposed between the first electrodes and the at least one electrode on both sides of the light ray passages are rotates to be opposite to each other, by steering the rotation of the transflective portions, then, light rays incident at a wide-angle with reference to a normal direction at the light emergent side of the light source device may be reflected by the opposite light-reflecting portions and then pass through the light ray passages to implement the wide-display functionality. As illustrated in FIG. 5, in a condition that the peep-proof display functionality is required to be implement (abbreviated as a "peep-proof display mode" hereinafter), it is not required to establish any electric field between the first electrodes and the at least one second electrode. Then the transflective portions are out of control without any electric field, i.e., in a disordered status, and thus the optical paths of the light-transmitting portions of the transflective portions in the disordered status facilitate an optical communication between the light-absorption portions and the light ray passages on both sides of the transflective portions. Hereby a continuous and successive light propagation path is established, among one light-absorption portion and one transparent first electrode and light-transmitting portions of one transflective portion at a side of the first gap, and the second electrode, and another light-absorption portion and another transparent first electrode and light-transmitting portions of another transflective portion at an opposite side of the first gap, such that for example light rays incident from a lower side of the drawing as illustrated (e.g, from the light source device located at the lower side) may transmit through the continuous and successive light propagation path, and then relatively wide angle portions of the incident light rays may be transmitted into the light-absorption portions and absorbed there, with merely relatively narrow angle portions of the incident light rays passing through the first gap functioning as the light ray passage (especially through the light-transmitting portions of the transflective portion in each second gap inside the first gap) and then exiting from the light adjustment device to the observer's eye(s) so as to implement display functionality. Thereby, the relatively wide angle portions of the incident light rays enter the light ray passages, and then are incident on and absorbed by the light-absorption portions through the light-transmitting portions; while relatively narrow angle portions of the incident light rays may for example propagate through the light ray passage and then implement the display functionality. As such, as compared with relevant art, in the peep-proof display mode, there may exist a relatively weak display luminance due to light loss caused by transmission to the light-absorption portions; while in another wide-angle display mode, a relatively strong luminance may be obtained since there is no such light loss in the wide-angle display mode.

In further embodiments, as illustrated in the flow chart of FIG. 8(b), above step of "providing a plurality of light-absorption portions spaced apart from one another on a side of a transparent substrate" for example specifically comprises:

forming a light ray reflecting layer 6 on a side of the transparent substrate 1; and forming a plurality of light-absorption portions 2 spaced apart from one another on a side of the light ray reflecting layer 6 facing away from the transparent substrate 1.

Specifically, the light ray reflecting layer 6 is located on a side of the light-absorption portions facing towards a light incidence direction of the light ray passages; in other words, the light ray reflecting layer 6 is provided on a side of the transparent substrate facing towards the light adjustment device formed on the light ray reflecting layer, by abutting against a surface at a side of light adjustment device facing towards the transparent substrate. As such, it facilitates a reflection of light rays irradiating in the light incidence direction of the light ray passages, effectively preventing the light rays from being absorbed by the light-absorption portions.

Alternatively or additionally, in other embodiments of the disclosure, referring back to FIG. 8(a), in specific embodiments of the disclosure, prior to the step of "providing at least one second electrode which is also transparent in the first gaps respectively" and after the step of "providing first electrodes which are transparent between each two adjacent light-absorption portions of the plurality of light-absorption portions respectively", the method further comprises: forming at least one transparent column on a side of the light ray reflecting layer facing away from the transparent substrate, at least one transparent column being provided between the plurality of light-absorption portions spaced apart from one another, respectively; the transparent column being located between adjacent light-absorption portions spaced apart from each other, both heights of the transparent column and the light-absorption portions being for example in a range of 20 μm and 50 μm.

Alternatively or additionally, in other embodiments of the disclosure, referring back to FIG. 8(a), in specific embodiments of the disclosure, alternatively, prior to the step of "providing first electrodes which are transparent between each two adjacent light-absorption portions of the plurality of light-absorption portions respectively" and after the step of "providing a plurality of light-absorption portions spaced apart from one another on a side of a transparent substrate", as illustrated in dotted line, the method further comprises: forming at least one transparent column on a side of the light ray reflecting layer facing away from the transparent substrate, at least one transparent column being provided between the plurality of light-absorption portions spaced apart from one another, respectively; the transparent column being located between adjacent light-absorption portions spaced apart from each other, both heights of the transparent column and the light-absorption portions being for example in a range of 20 μm and 50 μm.

In further embodiments, correspondingly, above step of "providing at least one second electrode which is also transparent in the first gaps respectively" for example comprises:

forming a respective second electrode of the at least one second electrode on outer surfaces of each transparent column at both sides thereof, one portion of the respective second electrode at one side of the transparent column being opposite to a respective one first electrode on a side of the transparent column, while another portion of the respective second electrode at the other side of transparent column being opposite to another respective one first electrode on the other side of the transparent column.

In further embodiments, as illustrated in the flow chart of FIG. 8(c), above step of "providing transflective portions which are electrically polarized, each transflective portion being between each second electrode and a respective one adjacent first electrode respectively" for example comprises:

forming a plurality of transparent spheres by a crystallization process, specifically, each transparent sphere having a diameter ranging between 50 μm and 500 μm;

placing each of the plurality of transparent spheres inside a respective hemispherical groove, and then forming a metal reflective layer covering an exposed portion of an outer surface of each of the plurality of transparent spheres (i.e., respective portions of the outer surfaces of the spheres which are not shielded by respective hemispherical grooves for containing the spheres) by evaporation;

preparing a plurality of transflective spheres which are electrically polarized, by supplying the metal reflective layer evaporated on the exposed portions of the outer surface of each of the plurality of transparent spheres with charge having a single electric polarity; and forming the transflective portions by mixing the plurality of transflective spheres within a solution.

Specifically, for example, in each transflective sphere, a portion of its outer surface which is coated with the metal reflective layer is defined as the light-reflecting portion, and another portion of its outer surface which is not coated with the metal reflective layer is defined as the light-transmitting portion.

In above embodiments, depictions of different embodiments place emphasis on different aspects, thus some portions in some embodiments which are not depicted in detail may refer to relevant depictions of other embodiments.

The method of preparing the light adjustment device in embodiments of the disclosure also has technical effects and advantages of aforementioned light adjustment device, without repeating herein any more.

As compared with relevant art, then, on the basis of above technical solutions, the light adjustment device, the display device and the method of preparing the light adjustment device in embodiments of the disclosure possess at least following advantages:

In the technical solution provided in embodiments of the disclosure, the light adjustment device may be provided at a light emergent side of the light source device of the display device, and the light source device is configure to emit light towards an light incidence side of the light ray passages. In the wide-angle display mode, an electric field may be established between the first electrodes and the at least second electrodes, which may steer the transflective portions to be turned, such that light-reflecting portions between the at least one second electrode and the first electrode on both sides of the light ray passages may be opposite to each other, and thus light rays of relatively wide angle may be reflected by the opposite reflecting portions and pass through the light ray passages to implement the wide-angle display functionality. In the peep-proof display mode, it is not required to establish any electric field between the first electrodes and the at least one second electrode, the transflective portions may then be in a disordered status out of the control of any electric field, and thus the optical paths of the light-transmitting portions of the transflective portions in the disordered status may establish an optical communication between the light-absorption portions and the light ray passages on both sides of the transflective portions, then the light rays of relatively wide angle may enter the light ray passages and propagate through the light-transmitting portions and in turn enter the light-absorption portions, and light rays of relatively narrow angle may implement display after passing through the light ray passages, such that the light luminance shown by light rays of wide-angle may be relatively strong, as compared with relevant art.

Various embodiments of the present disclosure have been illustrated progressively, the same or similar parts of which can be referred to each other or one another. The differences among these various embodiments are described in emphasis.

t should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present disclosure exemplarily, and should not be deemed as a restriction thereof.

Although several exemplary embodiments of the general concept of the present disclosure have been shown and described, it would be appreciated by those skilled in the art that various changes or modifications may be made in these embodiments without departing from the principles and spirit of the disclosure and lie within the scope of present application, which scope is defined in the claims and their equivalents.

As used herein, an element recited in the singular and proceeded with the word "a" or "an" should be understood as not excluding plural of said elements or steps, unless such exclusion is explicitly stated. Moreover, unless explicitly stated to the contrary, embodiments "comprising" or "having" an element or a plurality of elements having a particular property may include additional such elements not having that property.

What is claimed is:

1. A light adjustment device, comprising:
   a plurality of light-absorption portions spaced apart from one another, with first gaps each functioning as light ray passages and being formed between each two adjacent light-absorption portions of the plurality of light-absorption portions, respectively;
   first electrodes being transparent and provided between each two adjacent light-absorption portions of the plurality of light-absorption portions respectively and at least partially located on both sides of each of the light ray passages;
   at least one second electrode being also transparent, each second electrode being provided in a respective one of the first gaps respectively, with second gaps each being formed between each second electrode and a respective adjacent one of the first electrodes; and
   transflective portions being electrically polarized and provided in the second gaps respectively, comprising light-transmitting portions and light-reflecting portions, the light-reflecting portions being steerable to be turned under an action of an electric field force.

2. The light adjustment device according to claim 1, wherein in response to a first steering condition of the transflective portions where at least one type of the first electrodes and the at least one second electrode are not energized and thus no electric field force is established therebetween to act on the transflective portions, the light-transmitting portions communicate optically with the plurality of light-absorption portions and the light ray passages on both sides of the transflective portions, respectively; and in response to a second steering condition of the transflective portions, where the transflective portions are steered to be turned thereto under the action of an electric field force applied by an electric field which is established between the first electrodes and at least one second electrode once both the first electrodes and the at least one second electrode are energized respectively and is then provided for the light-reflecting portions of the transflective portions, the light-reflecting portions between the first electrodes and respective portions of the at least one second electrode on both sides of the light ray passages are respectively turned to opposite to each other.

3. The light adjustment device according to claim 2, wherein in a condition that the first electrodes and the at least one second electrode cooperate with each other to provide the electric field force for the light-reflecting portions of the transflective portions, the first electrodes have an electric polarity opposite to that of the at least one second electrode.

4. The light adjustment device according to claim 1, further comprising:
a light ray reflecting layer, on a side of the plurality of light-absorption portions facing towards a light incidence direction of the light ray passages.

5. The light adjustment device according to claim 1, wherein the transflective portions comprises a solution accommodated within the second gaps and arranged in an extension direction of an optical path through the light ray passages and a plurality of transflective spheres mixed within the solution, each of the plurality of transflective spheres comprising a transparent sphere and a metal reflective layer covering a portion of an outer surface of the transparent sphere at a side thereof, the metal reflective layer being a metallic layer with charge of a single electric polarity and having a reflective surface.

6. The light adjustment device according to claim 1, wherein
the plurality of light-absorption portions spaced apart from one another comprise a first light absorber and a second light absorber opposite to each other;
the first electrodes comprise a first electrode layer provided on a side of the first light absorber facing towards the second light absorber, and a second electrode layer provided on a side of the second light absorber facing towards the first light absorber;
the transflective portions comprises a first transflective layer and a second transflective layer being provided respectively between the first electrodes and respective portions of the at least one second electrode on both sides of the light ray passages, with a transparent column between the first transflective layer and the second transflective layer; and
the at least one second electrode comprises a third electrode layer and a fourth electrode layer respectively provided at both sides of the transparent column, the third electrode layer being arranged opposite to the first electrode layer, and the fourth electrode layer being arranged opposite to the second electrode layer.

7. A display device, comprising:
a light source device; and
the light adjustment device according to claim 1, on a light-emergent side of the light source device,
wherein the light source device is configured to emit light towards a light-incidence side of the light ray passages.

8. The display device according to claim 7, further comprising a display panel, the light source device functioning as a backlight source configured to provide backlight to the display panel,
wherein the light adjustment device is located between the display panel and the backlight source.

9. A method of preparing a light adjustment device, comprising:
providing a plurality of light-absorption portions spaced apart from one another on a side of a transparent substrate, with first gaps each being formed between each two adjacent light-absorption portions of the plurality of light-absorption portions and functioning as light ray passages, respectively;
providing first electrodes which are transparent between each two adjacent light-absorption portions of the plurality of light-absorption portions respectively, the first electrodes being at least partially located on both sides of each of the light ray passages;
providing at least one second electrode which is also transparent in the first gaps respectively, with second gaps each being formed between each second electrode and a respective adjacent one of the first electrodes; and
providing transflective portions which are electrically polarized between the at least one second electrode and respective adjacent first electrodes respectively, the transflective portions comprising light-transmitting portions and light-reflecting portions, the light-reflecting portions being steerable to be turned under an action of an electric field force.

10. The method according to claim 9, further comprising: preparing the transflective portions, the step of "providing transflective portions" comprising:
forming a plurality of transparent spheres by a crystallization process;
placing each of the plurality of transparent spheres inside a respective hemispherical groove, and then forming a metal reflective layer covering an exposed portion of an outer surface of each of the plurality of transparent spheres by evaporation;
preparing a plurality of transflective spheres which are electrically polarized, by supplying the metal reflective layer evaporated on the exposed portions of the outer surface of each of the plurality of transparent spheres with charge having a single electric polarity; and
forming the transflective portions by mixing the plurality of transflective spheres within a solution.

11. The method according to claim 9, wherein the step of "providing a plurality of light-absorption portions spaced apart from one another on a side of a transparent substrate" comprises:
forming a light ray reflecting layer on a side of the transparent substrate; and
forming a plurality of light-absorption portions spaced apart from one another on a side of the light ray reflecting layer facing away from the transparent substrate.

12. The method according to claim 11, wherein the light ray reflecting layer is provided on a side of the transparent substrate facing towards the light adjustment device formed on the light ray reflecting layer, by abutting against a surface at a side of light adjustment device facing towards the transparent substrate.

13. The method according to claim 11, wherein prior to the step of "providing at least one second electrode which is also transparent in the first gaps respectively" and after the step of "providing first electrodes which are transparent between each two adjacent light-absorption portions of the plurality of light-absorption portions respectively", the method further comprises:
   forming at least one transparent column on a side of the light ray reflecting layer facing away from the transparent substrate, at least one transparent column being provided between the plurality of light-absorption portions spaced apart from one another, respectively.

14. The method according to claim 13, wherein the step of "providing at least one second electrode which is also transparent in the first gaps respectively" comprises:
   forming a respective second electrode of the at least one second electrode on outer surfaces of each transparent column at both sides thereof, one portion of the respective second electrode at one side of the transparent column being opposite to a respective one first electrode on a side of the transparent column, while another portion of the respective second electrode at the other side of transparent column being opposite to another respective one first electrode on the other side of the transparent column.

15. The method according to claim 11, wherein prior to the step of "providing first electrodes which are transparent between each two adjacent light-absorption portions of the plurality of light-absorption portions respectively" and after the step of "providing a plurality of light-absorption portions spaced apart from one another on a side of a transparent substrate", the method further comprises:
   forming at least one transparent column on a side of the light ray reflecting layer facing away from the transparent substrate, at least one transparent column being provided between the plurality of light-absorption portions spaced apart from one another, respectively.

16. The method according to claim 15, wherein the step of "providing at least one second electrode which is also transparent in the first gaps respectively" comprises:
   forming a respective second electrode of the at least one second electrode on outer surfaces of each transparent column at both sides thereof, one portion of the respective second electrode at one side of the transparent column being opposite to a respective one first electrode on a side of the transparent column, while another portion of the respective second electrode at the other side of transparent column being opposite to another respective one first electrode on the other side of the transparent column.

* * * * *